(12) United States Patent
Baker et al.

(10) Patent No.: US 9,954,354 B2
(45) Date of Patent: Apr. 24, 2018

(54) METHODS AND APPARATUS FOR MITIGATION OF DAMAGE OF POWER LINE ASSETS FROM TRAVELING ELECTRICAL ARCS

(71) Applicant: SENTIENT ENERGY, INC., Burlingame, CA (US)

(72) Inventors: Peter Baker, Oakland, CA (US); Dennis Allen Saxby, Los Gatos, CA (US); James E. Steiner, Burlingame, CA (US); David P. Knight, Mountain View, CA (US); Brian Charles Hewett, Los Altos Hills, CA (US); Mark A. Parsons, Boulder, CO (US)

(73) Assignee: SENTIENT ENERGY, INC., Burlingame, CA (US)

( * ) Notice: Subject to any disclaimer, the term of this patent is extended or adjusted under 35 U.S.C. 154(b) by 57 days.

(21) Appl. No.: 14/989,629

(22) Filed: Jan. 6, 2016

(65) Prior Publication Data

US 2016/0197470 A1 Jul. 7, 2016

Related U.S. Application Data

(60) Provisional application No. 62/100,420, filed on Jan. 6, 2015.

(51) Int. Cl.
*H02H 9/00* (2006.01)
*H02H 9/04* (2006.01)

(52) U.S. Cl.
CPC .................................. *H02H 9/005* (2013.01)

(58) Field of Classification Search
CPC ......... H02H 9/005; H02H 9/041; H02H 9/042
See application file for complete search history.

(56) References Cited

U.S. PATENT DOCUMENTS

| 3,075,166 A | 1/1963 | Peek |
| 3,558,984 A | 1/1971 | Smith et al. |

(Continued)

FOREIGN PATENT DOCUMENTS

| EP | 1508146 A | 2/2005 |
| EP | 1938159 A | 7/2008 |

(Continued)

OTHER PUBLICATIONS

Chen et al.; Development of arc-guided protection devices against lightning breakage of covered conductors on distribution lines; IEEE Trans. Power Deilv.; 25(1); pp. 196-205; Jan. 2010.

(Continued)

*Primary Examiner* — Nathan Milakovich
(74) *Attorney, Agent, or Firm* — Shay Glenn LLP

(57) ABSTRACT

A power distribution monitoring system is provided that can include a number of features. The system can include a plurality of power line sensing devices configured to attach to individual conductors on a power grid distribution network. The sensing devices can be configured to measure and monitor, among other things, current and electric-field on the conductors. The system can further include one or more arc shields positioned near the sensing devices and configured to prevent damage to the conductor or sensing device in the event of a traveling arc. Methods of installing and protecting the system are also discussed.

19 Claims, 9 Drawing Sheets

(56) References Cited

U.S. PATENT DOCUMENTS

| | | |
|---|---|---|
| 3,676,740 A | 7/1972 | Schweitzer, Jr. |
| 3,686,531 A | 8/1972 | Decker et al. |
| 3,702,966 A | 11/1972 | Schweitzer, Jr. |
| 3,708,724 A | 1/1973 | Schweitzer, Jr. |
| 3,715,742 A | 2/1973 | Schweitzer, Jr. |
| 3,720,872 A | 3/1973 | Russell et al. |
| 3,725,832 A | 4/1973 | Schweitzer, Jr. |
| 3,755,714 A | 8/1973 | Link |
| 3,768,011 A | 10/1973 | Swain |
| 3,777,217 A | 12/1973 | Groce et al. |
| 3,814,831 A * | 6/1974 | Olsen .................. H02B 13/065 174/28 |
| 3,816,816 A | 6/1974 | Schweitzer, Jr. |
| 3,866,197 A | 2/1975 | Schweitzer, Jr. |
| 3,876,911 A | 4/1975 | Schweitzer, Jr. |
| 3,957,329 A | 5/1976 | McConnell |
| 3,970,898 A | 7/1976 | Baumann et al. |
| 4,063,161 A | 12/1977 | Pardis |
| 4,152,643 A | 5/1979 | Schweitzer, Jr. |
| 4,339,792 A | 7/1982 | Yasumura et al. |
| 4,378,525 A | 3/1983 | Burdick |
| 4,396,794 A * | 8/1983 | Stiller .................... H01B 17/22 174/144 |
| 4,396,968 A * | 8/1983 | Stiller .................... H01B 17/22 174/144 |
| 4,398,057 A * | 8/1983 | Shankle ................. H01B 17/22 174/2 |
| 4,408,155 A | 10/1983 | McBride |
| 4,466,071 A | 8/1984 | Russell, Jr. |
| 4,559,491 A | 12/1985 | Saha |
| 4,570,231 A | 2/1986 | Bunch |
| 4,584,523 A | 4/1986 | Elabd |
| 4,649,457 A * | 3/1987 | Talbot ................... H02H 9/044 361/111 |
| 4,654,573 A | 3/1987 | Rough et al. |
| 4,709,339 A | 11/1987 | Fernandes |
| 4,714,893 A | 12/1987 | Smith Vaniz et al. |
| 4,723,220 A | 2/1988 | Smith Vaniz |
| 4,728,887 A | 3/1988 | Davis |
| 4,746,241 A | 5/1988 | Burbank |
| 4,766,549 A | 8/1988 | Schweitzer, III et al. |
| 4,775,839 A | 10/1988 | Kosina et al. |
| 4,808,916 A | 2/1989 | Smith Vaniz |
| 4,829,298 A | 5/1989 | Fernandes |
| 4,881,028 A | 11/1989 | Bright |
| 4,886,980 A | 12/1989 | Fernandes et al. |
| 4,904,932 A | 2/1990 | Schweitzer, Jr. |
| 4,937,769 A | 6/1990 | Verbanets |
| 5,006,846 A | 4/1991 | Granville et al. |
| 5,125,738 A | 6/1992 | Kawamura et al. |
| 5,138,265 A | 8/1992 | Kawamura et al. |
| 5,159,561 A | 10/1992 | Watanabe et al. |
| 5,181,026 A | 1/1993 | Granville |
| 5,182,547 A | 1/1993 | Griffith |
| 5,202,812 A | 4/1993 | Shinoda et al. |
| 5,206,595 A | 4/1993 | Wiggins et al. |
| 5,220,311 A | 6/1993 | Schweitzer, Jr. |
| 5,428,549 A | 6/1995 | Chen |
| 5,438,256 A | 8/1995 | Thuries et al. |
| 5,473,244 A | 12/1995 | Libove et al. |
| 5,495,169 A | 2/1996 | Smith |
| 5,550,476 A | 8/1996 | Lau et al. |
| 5,565,783 A | 10/1996 | Lau et al. |
| 5,600,248 A | 2/1997 | Westrom et al. |
| 5,608,328 A | 3/1997 | Sanderson |
| 5,650,728 A | 7/1997 | Rhein et al. |
| 5,656,931 A | 8/1997 | Lau et al. |
| 5,682,100 A | 10/1997 | Rossi et al. |
| 5,696,788 A | 12/1997 | Choi et al. |
| 5,712,796 A | 1/1998 | Ohura et al. |
| 5,729,144 A | 3/1998 | Cummins |
| 5,737,203 A | 4/1998 | Barrett |
| 5,764,065 A | 6/1998 | Richards et al. |
| 5,839,093 A | 11/1998 | Novosel et al. |
| 5,892,430 A | 4/1999 | Wiesman et al. |
| 5,905,646 A | 5/1999 | Crewson et al. |
| 5,990,674 A | 11/1999 | Schweitzer, Jr. |
| 6,002,260 A | 12/1999 | Lau et al. |
| 6,016,105 A | 1/2000 | Schweitzer, Jr. |
| 6,043,433 A | 3/2000 | Schweitzer, Jr. |
| 6,133,723 A | 10/2000 | Feight |
| 6,133,724 A | 10/2000 | Schweitzer, Jr. et al. |
| 6,288,632 B1 | 9/2001 | Hoctor et al. |
| 6,292,340 B1 | 9/2001 | O'Regan et al. |
| 6,347,027 B1 | 2/2002 | Nelson et al. |
| 6,433,698 B1 | 8/2002 | Schweitzer, Jr. et al. |
| 6,459,998 B1 | 10/2002 | Hoffman |
| 6,466,030 B2 | 10/2002 | Hu et al. |
| 6,466,031 B1 | 10/2002 | Hu et al. |
| 6,477,475 B1 | 11/2002 | Takaoka et al. |
| 6,483,435 B2 | 11/2002 | Saha et al. |
| 6,549,880 B1 | 4/2003 | Willoughby et al. |
| 6,559,651 B1 | 5/2003 | Crick |
| 6,566,854 B1 | 5/2003 | Hagmann et al. |
| 6,577,108 B2 | 6/2003 | Hubert et al. |
| 6,601,001 B1 | 7/2003 | Moore |
| 6,622,285 B1 | 9/2003 | Rust et al. |
| 6,677,743 B1 | 1/2004 | Coolidge et al. |
| 6,718,271 B1 | 4/2004 | Tobin |
| 6,734,662 B1 | 5/2004 | Fenske |
| 6,798,211 B1 | 9/2004 | Rockwell et al. |
| 6,822,457 B2 | 11/2004 | Borchert et al. |
| 6,822,576 B1 | 11/2004 | Feight et al. |
| 6,879,917 B2 | 4/2005 | Turner |
| 6,894,478 B1 | 5/2005 | Fenske |
| 6,914,763 B2 | 7/2005 | Reedy |
| 6,917,888 B2 | 7/2005 | Logvinov et al. |
| 6,927,672 B2 | 8/2005 | Zalitsky et al. |
| 6,949,921 B1 | 9/2005 | Feight |
| 6,963,197 B1 | 11/2005 | Feight et al. |
| 6,980,090 B2 | 12/2005 | Mollenkopf |
| 7,023,691 B1 | 4/2006 | Feight et al. |
| 7,046,124 B2 | 5/2006 | Cope et al. |
| 7,053,601 B1 | 5/2006 | Fenske et al. |
| 7,072,163 B2 | 7/2006 | McCollough, Jr. |
| 7,076,378 B1 | 7/2006 | Huebner |
| 7,085,659 B2 | 8/2006 | Peterson et al. |
| 7,106,048 B1 | 9/2006 | Feight et al. |
| 7,158,012 B2 | 1/2007 | Wiesman et al. |
| 7,187,275 B2 | 3/2007 | McCollough, Jr. |
| 7,203,622 B2 | 4/2007 | Pan et al. |
| 7,272,516 B2 | 9/2007 | Wang et al. |
| 7,295,133 B1 | 11/2007 | McCollough, Jr. |
| 7,400,150 B2 | 7/2008 | Cannon |
| 7,424,400 B2 | 9/2008 | McCormack et al. |
| 7,449,991 B2 | 11/2008 | Mollenkopf |
| 7,450,000 B2 | 11/2008 | Gidge et al. |
| 7,508,638 B2 | 3/2009 | Hooper |
| 7,518,529 B2 | 4/2009 | O'Sullivan et al. |
| 7,532,012 B2 | 5/2009 | Cern |
| 7,557,563 B2 * | 7/2009 | Gunn ...................... G01R 1/22 324/117 H |
| 7,626,794 B2 | 12/2009 | Swartzendruber et al. |
| 7,633,262 B2 | 12/2009 | Lindsey et al. |
| 7,672,812 B2 | 3/2010 | Stoupis et al. |
| 7,683,798 B2 | 3/2010 | Rostron |
| 7,701,356 B2 | 4/2010 | Curt et al. |
| 7,714,592 B2 | 5/2010 | Radtke et al. |
| 7,720,619 B2 | 5/2010 | Hou |
| 7,725,295 B2 | 5/2010 | Stoupis et al. |
| 7,742,393 B2 | 6/2010 | Bonicatto et al. |
| 7,764,943 B2 | 7/2010 | Radtke |
| 7,795,877 B2 | 9/2010 | Radtke et al. |
| 7,795,994 B2 | 9/2010 | Radtke |
| 7,804,280 B2 | 9/2010 | Deaver, Sr. et al. |
| 7,930,141 B2 | 4/2011 | Banting |
| 8,421,444 B2 | 4/2013 | Gunn |
| 8,497,781 B2 | 7/2013 | Engelhardt et al. |
| 8,594,956 B2 | 11/2013 | Banting et al. |
| 8,786,292 B2 | 7/2014 | Parsons |
| 9,182,429 B2 | 11/2015 | Saxby et al. |
| 9,229,036 B2 | 1/2016 | Kast et al. |
| 9,581,624 B2 * | 2/2017 | Rostron ................. G01R 21/06 |

(56) References Cited

U.S. PATENT DOCUMENTS

| | | |
|---|---|---|
| 2004/0156154 A1 | 8/2004 | Lazarovich et al. |
| 2005/0073200 A1 | 4/2005 | Divan et al. |
| 2008/0077336 A1 | 3/2008 | Fernandes |
| 2009/0058582 A1 | 3/2009 | Webb |
| 2009/0309754 A1 | 12/2009 | Bou et al. |
| 2010/0085036 A1 | 4/2010 | Banting et al. |
| 2011/0032739 A1 | 2/2011 | Juhlin |
| 2012/0039062 A1 | 2/2012 | McBee et al. |
| 2012/0139554 A1* | 6/2012 | Parsons ............ G01R 35/04 324/543 |
| 2012/0236611 A1 | 9/2012 | Alexandrov et al. |
| 2013/0162136 A1 | 6/2013 | Baldwin et al. |
| 2013/0187637 A1* | 7/2013 | Saxby ............... G01R 21/00 324/127 |
| 2014/0062221 A1 | 3/2014 | Papastergiou et al. |
| 2014/0145858 A1 | 5/2014 | Miller et al. |
| 2014/0174170 A1 | 6/2014 | Davis |
| 2014/0192458 A1 | 7/2014 | Valdes |
| 2014/0226366 A1 | 8/2014 | Morokuma et al. |
| 2014/0260598 A1 | 9/2014 | Miller |
| 2015/0198667 A1 | 7/2015 | Krekeler |
| 2016/0069934 A1 | 3/2016 | Saxby et al. |
| 2017/0162320 A1 | 6/2017 | Rumrill |

FOREIGN PATENT DOCUMENTS

| | | |
|---|---|---|
| EP | 2340592 A | 7/2011 |
| EP | 2350764 A | 8/2011 |

OTHER PUBLICATIONS

Chen Yang Technologies; Split core hall effect dc current sensor CYHCT-C2TC; 4 pages; retrieved from the Internet Jan. 5, 2015 (http://www.hallsensors.de/CYHCT-C2TC.pdf) (Product Information).

Saha et al.; Fault Location on Power Networks (Power Systems); Springer Verlag; London, UK; 435 pgs.; 2010 (Preface: Oct. 2009).

Shepard et al.; An overview of rogowski coil current sensing technology; 13 pages; retrieved from the Internet Jan. 5, 2016 (http://www.dynamp.net/Idadocum.nsf/c2270fbdd892ac3e86256e75000ad88a/e710af6d3e0f6255862565d7004b19db/$FILE/Report.pdf).

Stringfield et al.; Fault location methods for overhead lines; in Transactions of the American Institute of Electrical Engineers; Amer. Inst. of Electrical Eng.; New York, NY; Part. III; vol. 76; pp. 518-530; Aug. 1957.

Kast et al.; U.S. Appl. No. 14/987,664 entitled "Energy harvest split core design for ease of installation, high performance, and long term reliability," filed Jan. 4, 2016.

\* cited by examiner

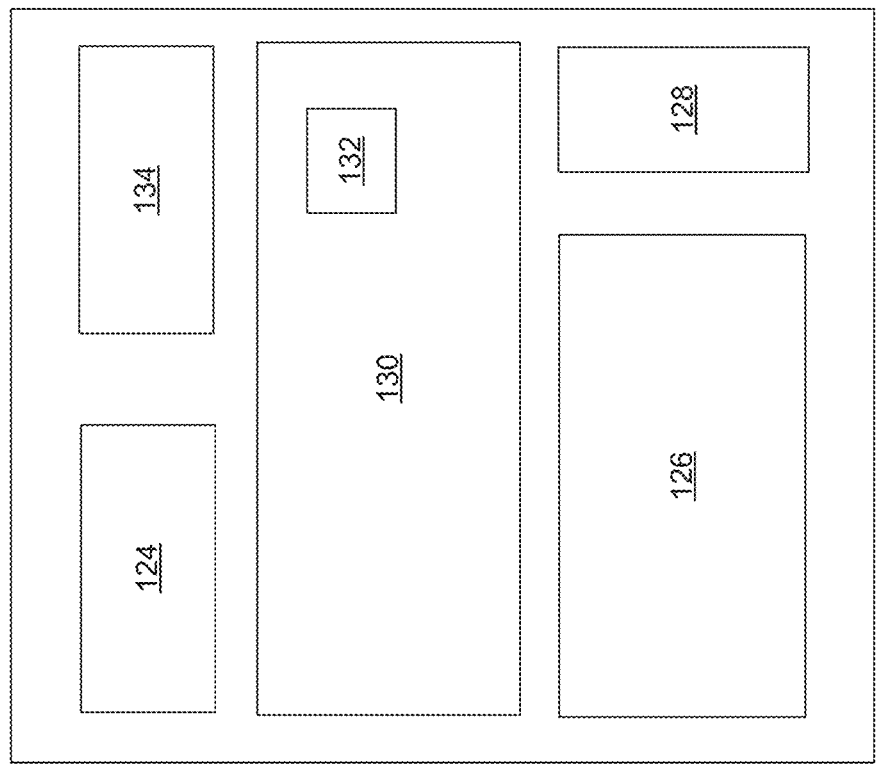

METHODS AND APPARATUS FOR MITIGATION OF DAMAGE OF POWER LINE ASSETS FROM TRAVELING ELECTRICAL ARCS

CROSS REFERENCE TO RELATED APPLICATIONS

This application claims the benefit under 35 U.S.C. 119 of U.S. Provisional Patent Application No. 62/100,420, filed Jan. 6, 2015, titled "Methods and Apparatus for Mitigation of Damage of Power Line Assets from Traveling Electrical Arcs", which application is incorporated by reference as if fully set forth herein.

INCORPORATION BY REFERENCE

All publications and patent applications mentioned in this specification are herein incorporated by reference to the same extent as if each individual publication or patent application was specifically and individually indicated to be incorporated by reference.

FIELD OF THE INVENTION

The present invention generally relates to power distribution networks. More specifically, the present invention relates to monitoring power distribution systems and preventing damage to line monitors and to the power distribution systems as a result of traveling arcs.

BACKGROUND OF THE INVENTION

In providing power to customers, electrical power utility companies employ a power grid distribution network that includes distribution-line-conductors (which are often referred to as power lines). Typically, difficulties or faults within the distribution network are identified only after occurrences of "events." These events may merely result in a temporary loss of power for a limited number of customers, but more significant problems may occur.

Protection components and systems are known. "Reactive" components are particularly common. A reactive component is a device or system that is activated or deactivated by a fault event or its consequences. For example, a circuit breaker will open a distribution line as a response to excessive current, thereby protecting power distribution equipment. More sophisticated systems are also available.

Clearly, there are benefits to identifying conditions that precede fault events. For example, if it can be determined that a power line from a power transformer is experiencing intermittent fluctuations, scheduling a replacement of the transformer to avoid an outage event would be beneficial to the utility provider and its customers. Thus, "predictive" components and systems are desirable. Line monitoring devices and systems that monitor power parameters of equipment and power lines can provide useful information for the prevention and identification of power distribution faults or events.

Electrical arcs can occur in power distribution grids due to a breakdown of insulation on the conductors, typically at insulators or across open switch contacts mounted on utility poles where the installation strength is weakest and most easily overcome by an overvoltage event. Electrical arcs may be overvoltage effects from direct or nearby lightning strikes, coupled with insulator damage and/or pollution. Traveling arcs typically occur between either two or three high voltage electrical conductors. Arcs typically travel, or 'motor', away from the generator or source, driven by the Lorentz Force. The speed of a traveling arc is proportional to the arc current, which in-turn is dependent on available fault current at the site of the arc. Thus, the speed of an arc is proportional to the distance of the arc location to the substation. Arcs are driven by magnetic forces, so a change in the magnetic circuit can result in a change in arc speed. A traveling arc is a column of ionized gas (plasma) that provides a conductive path for fault current to flow between conductors. This arc plasma is destructive because of a) its ionizing capabilities and b) high temperatures developed in the gas, approaching 10,000° K.

Monitoring devices deployed in production environments can cause damage to the surface of the conductor under traveling arc conditions. When a traveling arc moves along a conductor, it will linger on any metal structure on or near the conductor. Thus, monitoring devices deployed on power distribution networks give traveling arcs a place to "hang out" or linger, and act as a physical barrier for the hot arc gases. This allows the traveling arc to damage both the conductor itself, and also the monitoring devices, which can cause power outages and expensive damage to the power distribution network.

SUMMARY OF THE DISCLOSURE

A system configured to protect a power distribution network and devices mounted on the power distribution network from damage caused by a traveling arc is provided, comprising a line monitoring device mounted to a conductor of the power distribution network, a line mount mounted on the conductor adjacent to the line monitoring device, and a conductive shield attached to the line mount and comprising a sacrificial conductive material configured to be consumed by the traveling arc when the traveling arc interacts with the conductive shield.

In some embodiments, the conductive shield is generally perpendicular to the power line.

In another embodiment, the conductive shield comprises a generally circular shape.

In some embodiments, the conductive shield comprises a cutout feature through which the conductor can pass. In one embodiment, the cutout feature extends from a perimeter of the conductive shield to a central portion of the conductive shield.

In some embodiments, the conductive shield further comprises a plurality of holes configured to improve communications performance of the line monitoring device.

In one embodiment, the conductive shield has a diameter larger than a diameter or height of the line device.

In some embodiments, the line mount comprises a hot line clamp.

In one specific embodiment, the conductive shield is positioned on the conductor between a substation of the power distribution network and the line monitoring device.

In another embodiment, the line mount comprises a first line mount and the conductive shield comprises a first conductive shield, further comprising a second line mount mounted on the conductor adjacent to the line monitoring device, the line mount being mounted on an opposite side of the line monitoring device to the first line mount, and a second conductive shield attached to the second line mount and comprising a sacrificial conductive material configured to be consumed by the traveling arc when the traveling arc interacts with the second conductive shield.

In one embodiment, the conductive shield comprises aluminum. In another embodiment, the conductive shield comprises the same material as the conductor.

A method of protecting a power distribution network and devices mounted on the power distribution network from damage caused by a traveling arc is also provided, comprising mounting a line mount attached to a conductive shield on a conductor adjacent to a line monitoring device positioned on the conductor, and allowing the conductive shield to be consumed by the traveling arc when the traveling arc interacts with the conductive shield.

A system configured to protect a power distribution network and devices mounted on the power distribution network from damage caused by a traveling arc is provided, comprising a line monitoring device mounted to a conductor of the power distribution network, a line mount mounted on the conductor adjacent to the line monitoring device, and a conductive cage attached to the line mount and at least partially surrounding the line monitoring device, the conductive cage comprising a sacrificial conductive material configured to be consumed by the traveling arc when the traveling arc interacts with the conductive shield.

In one embodiment, the conductive cage comprises a plurality of conductive bars.

In another embodiment, the conductive cage comprises aluminum.

A system configured to protect a power distribution network and devices mounted on the power distribution network from damage caused by a traveling arc is also provided, comprising a line monitoring device mounted to a conductor of the power distribution network, a line mount mounted on the conductor adjacent to the line monitoring device, and a conductive shell attached to the line mount and at least partially covering the line monitoring device without contacting the line monitoring device, the conductive shell comprising a sacrificial conductive material configured to be consumed by the traveling arc when the traveling arc interacts with the conductive shield.

In some embodiments, the conductive shell is generally rectangular in shape.

In other embodiments, the conductive shield comprises at least one cutout feature through which the conductor can pass.

In one embodiment, the conductive shield comprises one or more plates configured to form one or more sides of the rectangular shape of the conductive shell.

BRIEF DESCRIPTION OF THE DRAWINGS

FIG. 1B illustrates one embodiment of electrical components disposed in a power line monitoring device.

DETAILED DESCRIPTION OF THE INVENTION

Methods and devices are provided herein for mitigating against the damage of electrical conductors beneath and adjacent to a line monitoring device when a traveling electrical arc passes over the location. Prior to this invention, line monitoring devices deployed in production environments have been found to cause minor damage to the surface of the conductor under traveling arc conditions.

Figure 1A:
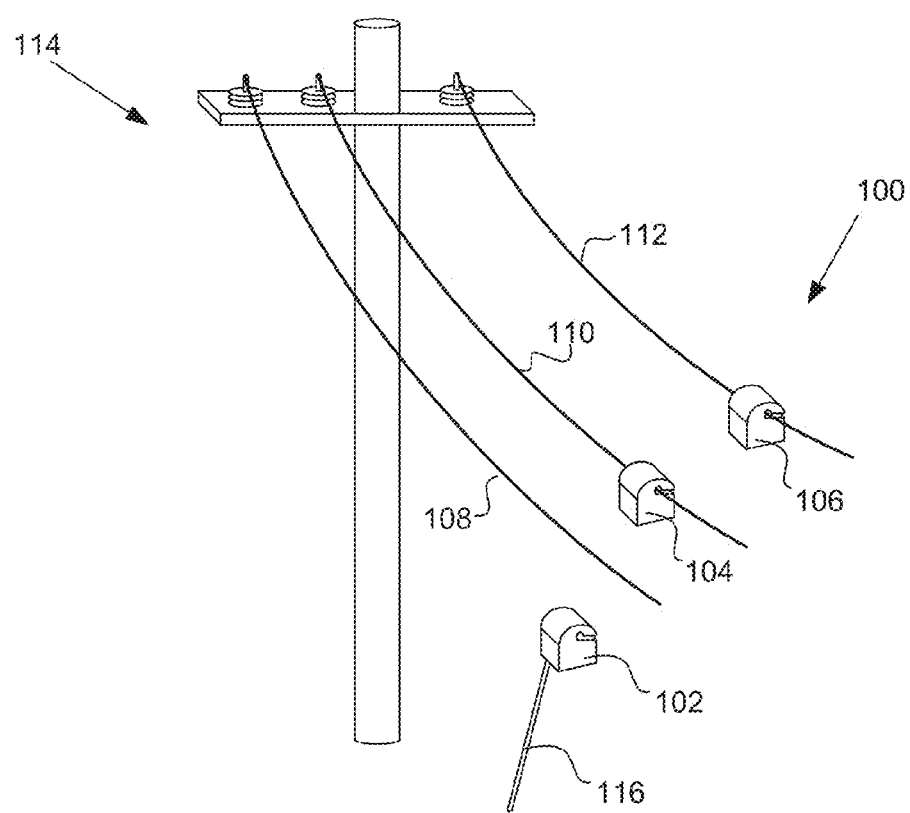
FIG. 1A illustrates one embodiment of a power line monitoring system.

Power line monitoring devices and systems described herein are configured to measure the currents and voltages of power grid distribution networks. Referring to FIG. 1A, monitoring system 100 comprises monitoring devices 102, 104, and 106 mounted to power line conductors 108, 110, and 112, respectively, of power distribution network 114. The power distribution network can be a three phase AC network, or alternatively, a single-phase network, for example. The power distribution network can be any type of network, such as a 60 Hz North American network, or alternatively, a 50 Hz network such as is found in Europe and Asia, for example. Power distribution networks, such as in the United States, typically operate at a medium voltage (e.g., 4 kV to 46 kV or higher) to reduce the energy lost during transmission over long distances. The monitoring devices can also be used on high voltage "transmission lines" or conductors that operate at voltages higher than 46 kV.

Monitoring devices 102, 104, and 106 can be mounted on each conductor of a three-phase network, as shown, and can be configured to monitor, among other things, current values and waveforms, conductor temperatures, ambient temperatures, vibration, wind speed and monitoring device system diagnostics. In some embodiments, a fourth sensor can be mounted on the ground conductor associated with the three phase lines. The monitoring devices can measure current in peak amplitude or root-mean-square (RMS) values and waveforms with, for example, with Rogowski coils, Hall-effect sensors, current transformers, or other similar current measurement devices.

In additional embodiments, multiple sensors can be used on a single phase line. The monitoring devices can be mounted quickly and easily via a hot-stick 116, and can harvest energy from the power lines for operation or be self powered (e.g., include batteries or solar panels). The monitoring devices can further include wireless transmission and receiving capabilities for communication with a central server and for communications between each monitoring device. Installation of a three monitoring device array can be placed and configured by a single linesman with a hot-stick and a bucket truck in less than 20 minutes. Monitoring device communication with the installation crew can be enabled during the installation process to provide immediate verification of successful installation.

FIG. 1B is a schematic drawing of the electronics 107 utilized in one embodiment of a monitoring device 102. In some embodiments, the electronics 107 of the monitoring device 102 can include sensors and hardware configured to measure current on the conductors and the electric field surrounding the conductors, can record and analyze power factor signatures, fault event signatures, and classify event waveforms. Current and electric field waveform signatures can be monitored and catalogued by the monitoring devices to build a comprehensive database of events, causes, and remedial actions. In some embodiments, an application executed on a central server can provide waveform and event signature cataloguing and profiling for access by the monitoring devices and by utility companies. This system can provide fault localization information with remedial action recommendations to utility companies, pre-emptive equipment failure alerts, and assist in power quality management of the distribution grid.

The electronics 107 of monitoring device 102 can comprise sensing elements 124, a power supply 126 and battery 128 including energy harvesting components, a microprocessor board 130 and CPU 132, and high powered communication systems 134, including transmit and receive capabilities, disposed within a robust mechanical housing (as shown in FIG. 1A) designed for severe service conditions. The monitoring devices can be configured to withstand temperatures ranging from −40 to +85 C, EMI and ESD immunity, current and voltage impulse resistance, and driving rain and salt fog survival. The monitoring devices can also be configured to operate at up to 1000 A operating current, monitor fault currents up to 10 kA, with full functionality with a lifespan of at least 10 years in the field.

The monitoring device can be configured to calculate power parameters related to 3-phase operation, power delivery and fault conditions. Because the monitoring device 102 has the data from all three phases, and the data or waveforms are synchronized, calculations for 3-phase vector diagrams and 3-phase power quality can be made. Without relative time synchronization the data transferred to one CPU cannot be used fully. In some embodiments, time-sync'ed one-way communications is sufficient.

As described above, monitoring devices 102, 104, and 106 are configured to gain the performance and information-rich benefits equivalent to having direct voltage data by measuring the electric field surrounding a power grid distribution network instead. For electric field sensing, the sensing elements 124 can comprise any type of electrometer, such as a "field chopping" transducer, capacitive sensing plate with charge amplifier (CCA), or piezoelectric crystals to measure electric field.

Figure 2:
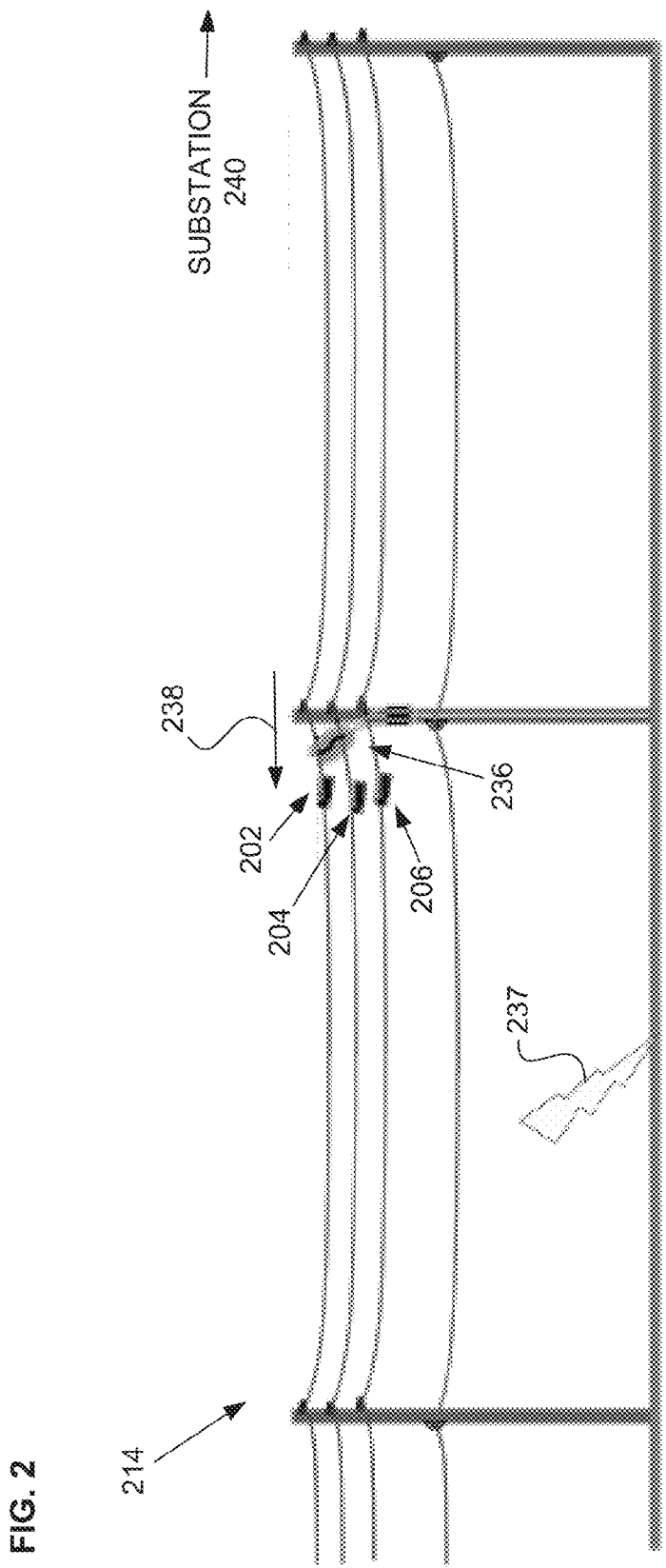
FIG. 2 shows a traveling arc on a power distribution network.

FIG. 2 illustrates an electrical arc 236 traveling along on or more conductors on a power distribution network 214 as the result of a lightning strike 237. In FIG. 2, the electrical arc 236 is shown traveling in the direction of arrow 238 (to the left of the page), traveling away from a substation 240 located at some position on the power distribution network to the right of the page. In FIG. 2, the electrical arc 236 is shown spanning across two conductors as it approaches line monitoring devices 202, 204, and 206. Traveling electrical arcs can occur between either two or three high voltage electrical conductors.

As described above, an electrical arc traveling along a power conductor can linger or "hang out" on any metal structure on or near the conductor. Thus, in the scenario of FIG. 2, the traveling electrical arc is likely to linger on one or more of the line monitoring devices 202, 204, and/or 206, which can result in damage to the conductor(s) and/or monitoring devices.

Figure 3A:
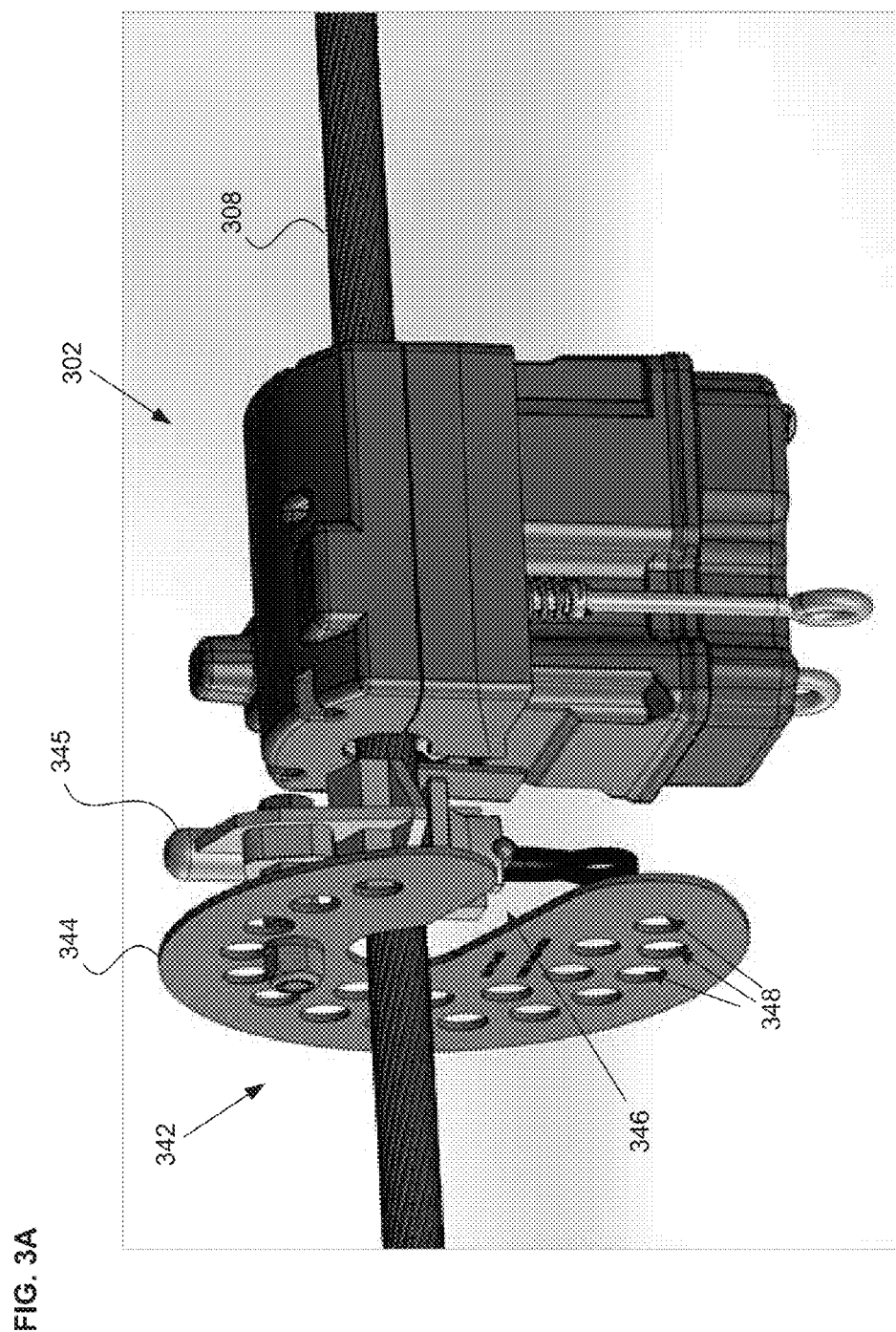
FIGS. 3A-3B show one embodiment of an arc shield having a conductive shield configured to prevent damage to the conductor or line device in the event of a traveling arc.
Figure 3B:
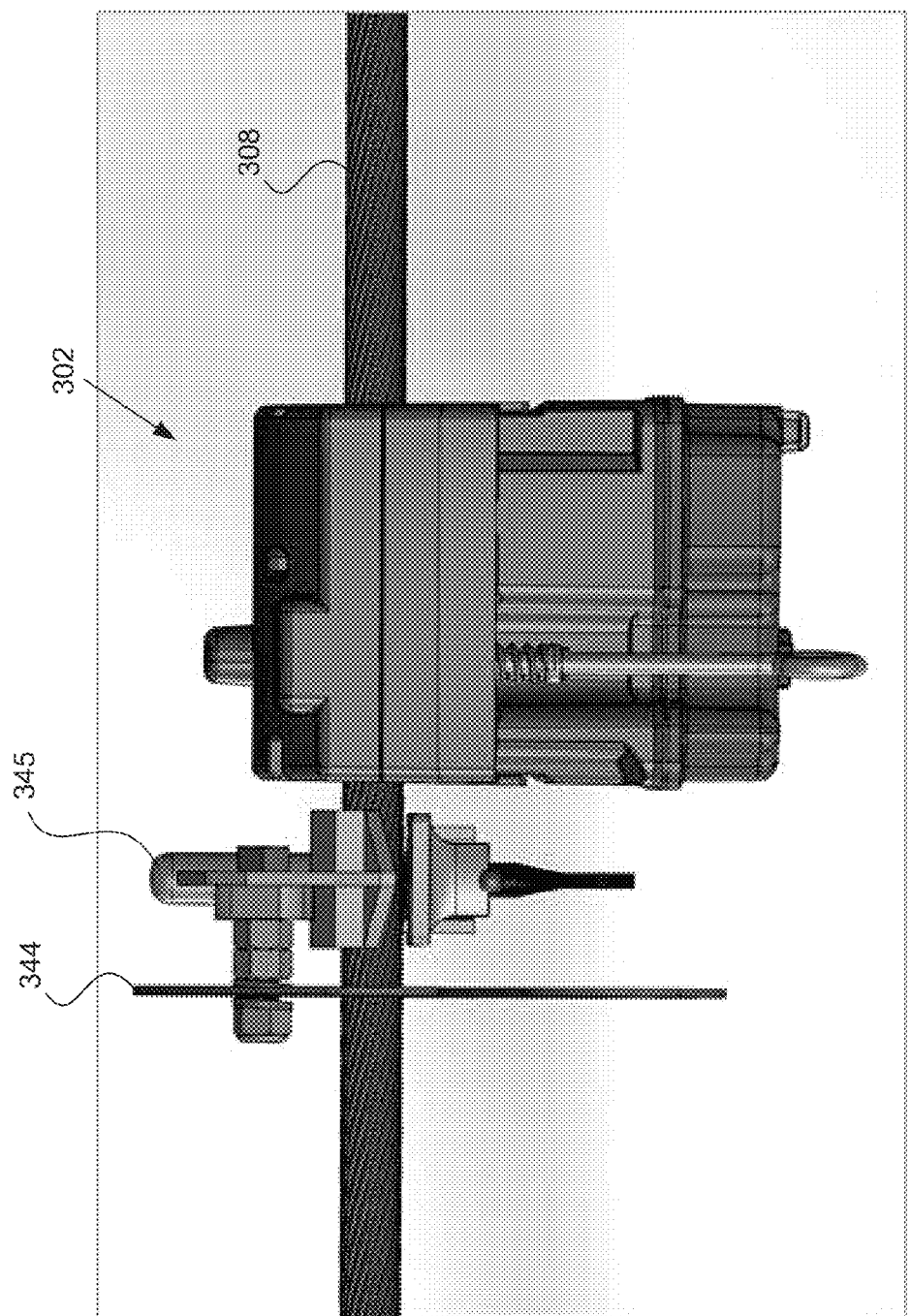

FIGS. 3A-3B show one embodiment of an arc shield configured to mitigate or prevent damage to a conductor and/or a line monitoring device in the event of a traveling arc. FIGS. 3A-3B illustrate a line monitoring device 302 installed on a conductor 308 of a power distribution network. In this embodiment, an arc shield 342 is installed on the conductor adjacent to or near to the line monitoring device. For example, the arc shield 342 can be installed 0-30 cm from the line monitoring device. In some embodiments, line monitoring devices and arc shields can be installed on each conductor of the power distribution network (typically 3 conductors). The arc shield can comprise a conductive shield 344 and a line mount 345. In this embodiment, the line mount is shown attached to the conductive shield and is configured to attach to the conductor 308 near the line monitoring device 302. The conductive shield can be bolted, screwed, or welded to the line mount, for example. In one embodiment, the arc shield can be mounted on the side of the line monitoring device that is likely to be hit by a traveling arc. Since traveling arcs travel or motor in the direction away from a substation, the arc shield is typically installed between the nearest substation of the power distribution network and the line monitoring device(s). The arc shields described herein can be installed anywhere on the power line adjacent to the device to be protected, and need not be constrained to installation at or near a pole of the power line.

In various embodiments, the conductive shield 344 of the arc shield 342 can comprise a variety of shapes and sizes. In the illustrated embodiment, the conductive shield is a generally planar surface that is circular in shape and includes a cutout feature 346. This particular embodiment can be considered a "C-shaped" conductive shield comprising a generally circular shape with a cutout that extends from a perimeter of the conductive shield to a central portion of the shield. The conductor can be configured to pass through this central portion of the cutout feature. The cutout feature 346 is designed to allow the conductive shield to be mounted on around the conductor to surround the conductor without actually touching the conductor itself. The conductive shield is configured to be mounted horizontally on the conductor so that the conductive shield is substantially perpendicular to the conductor.

The generally circular design of the arc shield in FIGS. 3A-3B is configured to offer a uniform physical profile to protect against traveling arcs 360° around the conductor. This supports deployment of a single device on all conductor configurations. The circular design further provides a uniform electric field profile around the circumference of the shield. This mitigates high e-field gradients on corners that can 'trap' electric arcs and focus arc damage. The opening or cutout through which the conductor passes is designed to: a) be of minimum width and, b) have an entry point with rounded corners. Both of these features maintain as uniform an e-field as possible around the shield, minimizing the amount of time the arc will dwell at a particular location on the shield. This is important to minimize the amount of material that is vaporized by the arc. In addition, the uniform physical and electric field profiles support local motoring of the arc around the circumference of the shield. This is understood to spread damage around the surface of the shield. The diameter of the shield determines the degree of protection the asset receives from the arc flash (arc gases) damage.

In the embodiment shown in FIG. 3A, the conductive shield 344 further includes a plurality of holes 348 within the shield. The holes 348 are placed within the conductive shield to reduce weight of the shield and to improve communication transmissions from the line monitoring device 302. In the illustrated embodiment, the conductive shield has approximately 19 holes with a ¾" diameter, and the holes are positioned at least 1.0" apart and 1.250" from the outer edge. For this specific embodiment, the hole size was developed through RF performance testing. Hole clearance from the edge of the shield is configured to provide sufficient material to support multiple hits from an electrical arc.

Figure 3C:
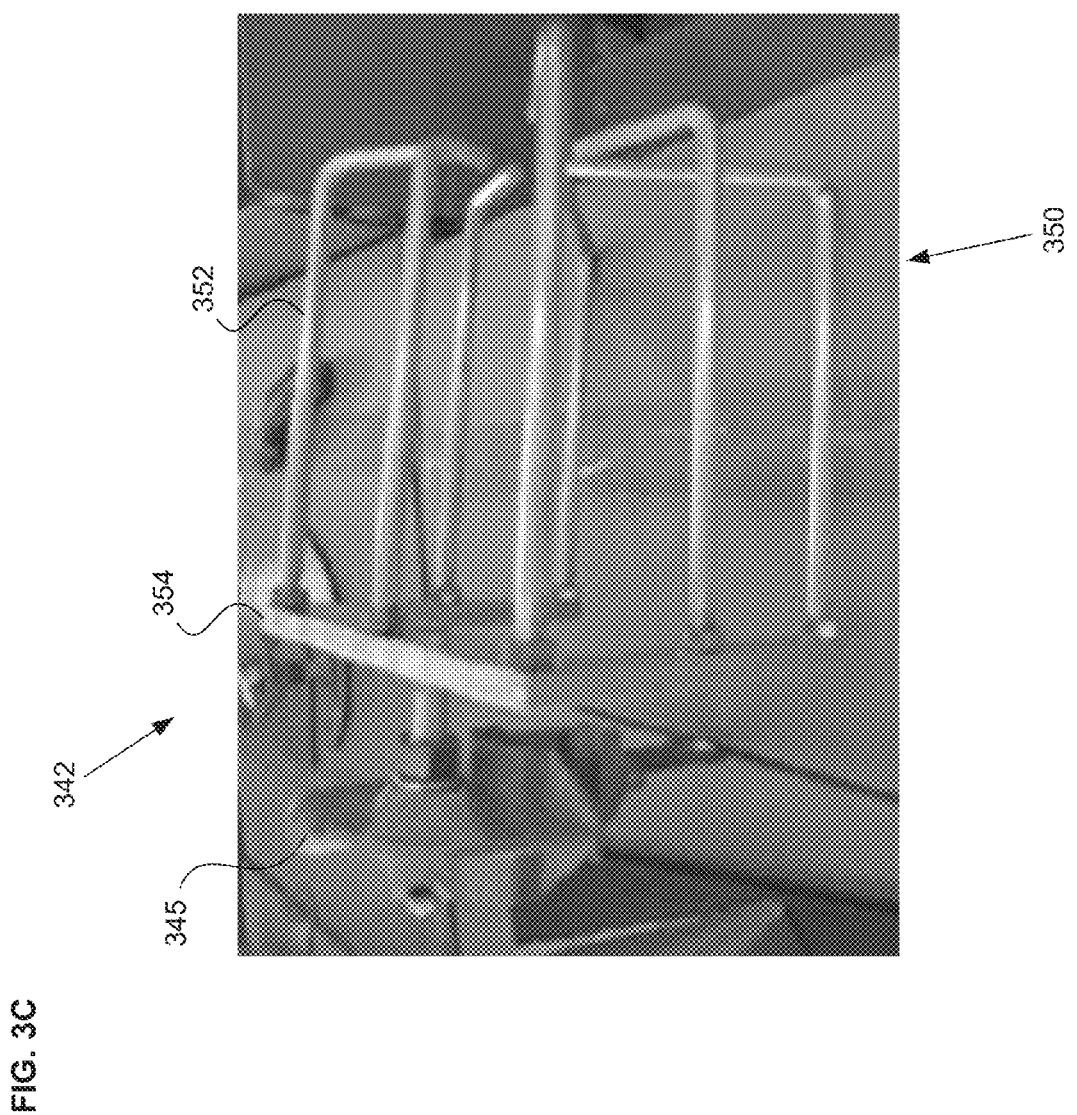
FIG. 3C shows one embodiment of an arc shield having a conductive cage configured to prevent damage to the conductor or line device in the event of a traveling arc.

In other embodiments, the arc shield can comprise different shapes and designs. For example, in the embodiment shown in FIG. 3C, the arc shield 342 can comprise a conductive cage 350 that surrounds some or all of a line monitoring device. This conductive cage 350 can be mounted to the power conductor with line mount 345 as described above, such that some or all of the conductive cage surrounds the line monitoring device also mounted to the conductor. As shown in FIG. 3C, the conductive cage 350 can comprise a plurality of bars 352 which attach to a plate 354 to form the conductive cage. The plate 354 can be arranged generally perpendicular to the conductor, and the bars can be generally parallel to the conductor. In some embodiments, the bars 352 can include a distal portion opposite to the plate that turns inwards to be generally perpendicular to the conductor, as shown.

Figure 3D:
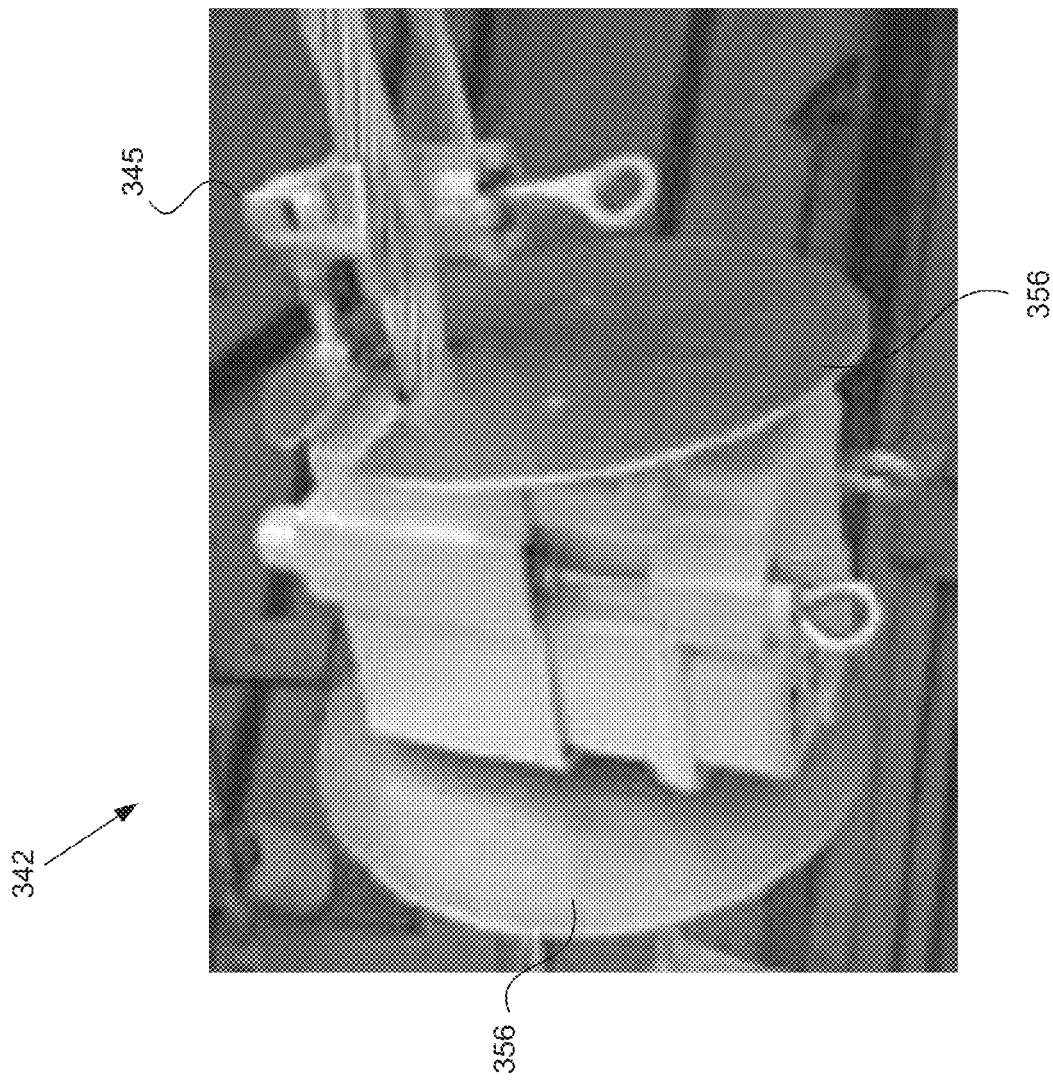
FIG. 3D shows one embodiment of an arc shield having a pair of conductive shields configured to prevent damage to the conductor or line device in the event of a traveling arc.

FIG. 3D shows another embodiment of an arc shield 342, similar to the embodiment described above with respect to FIGS. 3A-3B. In this embodiment, the arc shield comprises a pair of conductive shields 356 positioned on each side of the line monitoring device to "pancake" the device. The conductive shields can be mounted to the power conductor with line mounts 345 as described above. These conductive shields can further include the cutout feature 346 and holes 348 described above.

Figure 3E:
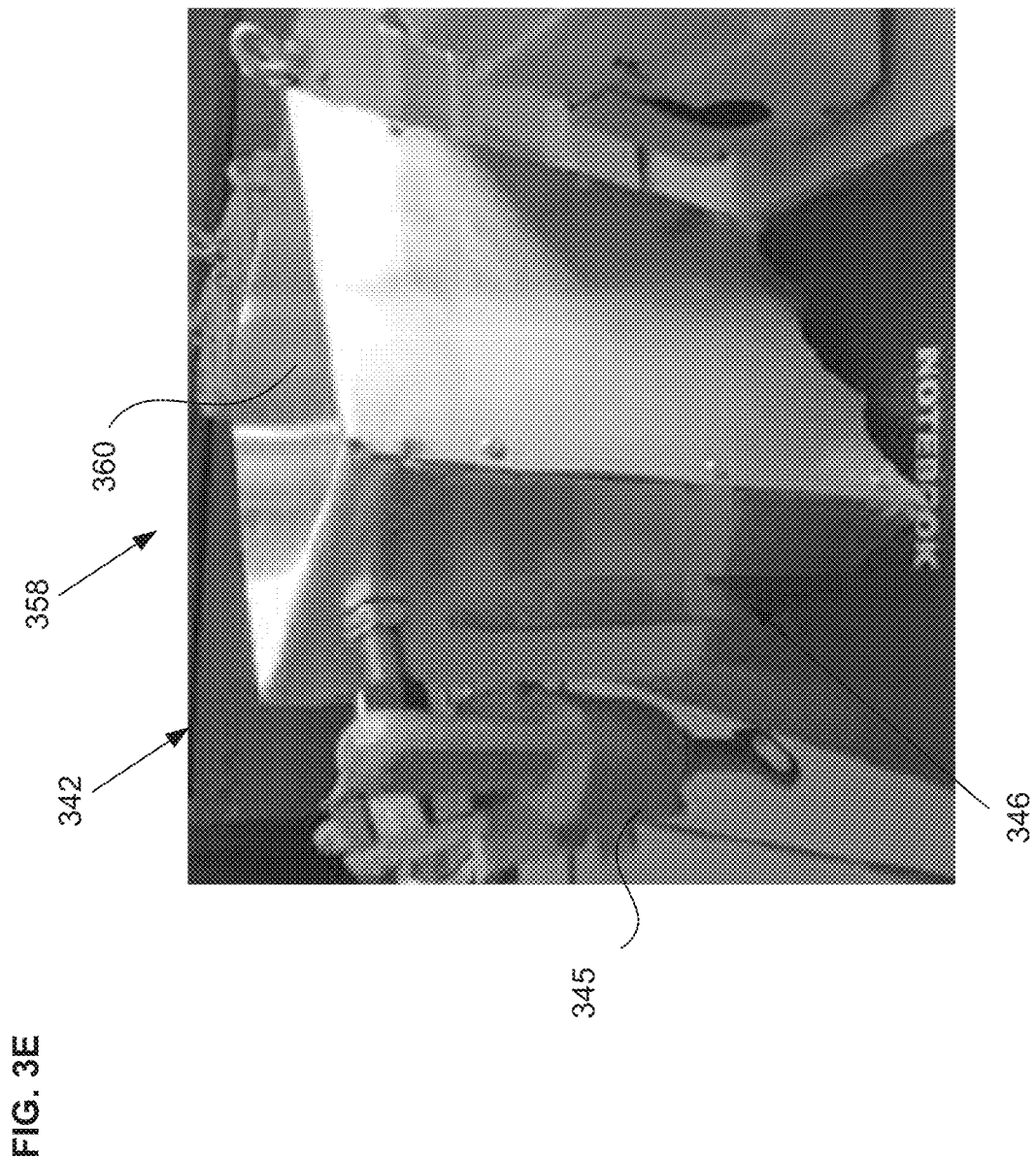
FIG. 3E shows one embodiment of an arc shield having a conductive shell configured to prevent damage to the conductor or line device in the event of a traveling arc.

FIG. 3E shows an alternative embodiment in which an arc shield 342 comprises a conductive shell 358 that partially or completely covers the line monitoring device. In this embodiment, the conductive shell 358 is mounted to the power conductor with a line mount 345, and surrounds but does not contact the line monitoring device located on the interior of the arc shield. As seen in FIG. 3E, the conductive shell can comprise one or more plates 360 that form one or more sides of the rectangular conductive shell. One or more of the plates 360 can include a cutout feature 346, as described above with respect to FIGS. 3A-3B, to permit passage of the conductor through the conductive shell.

Figure 3F:
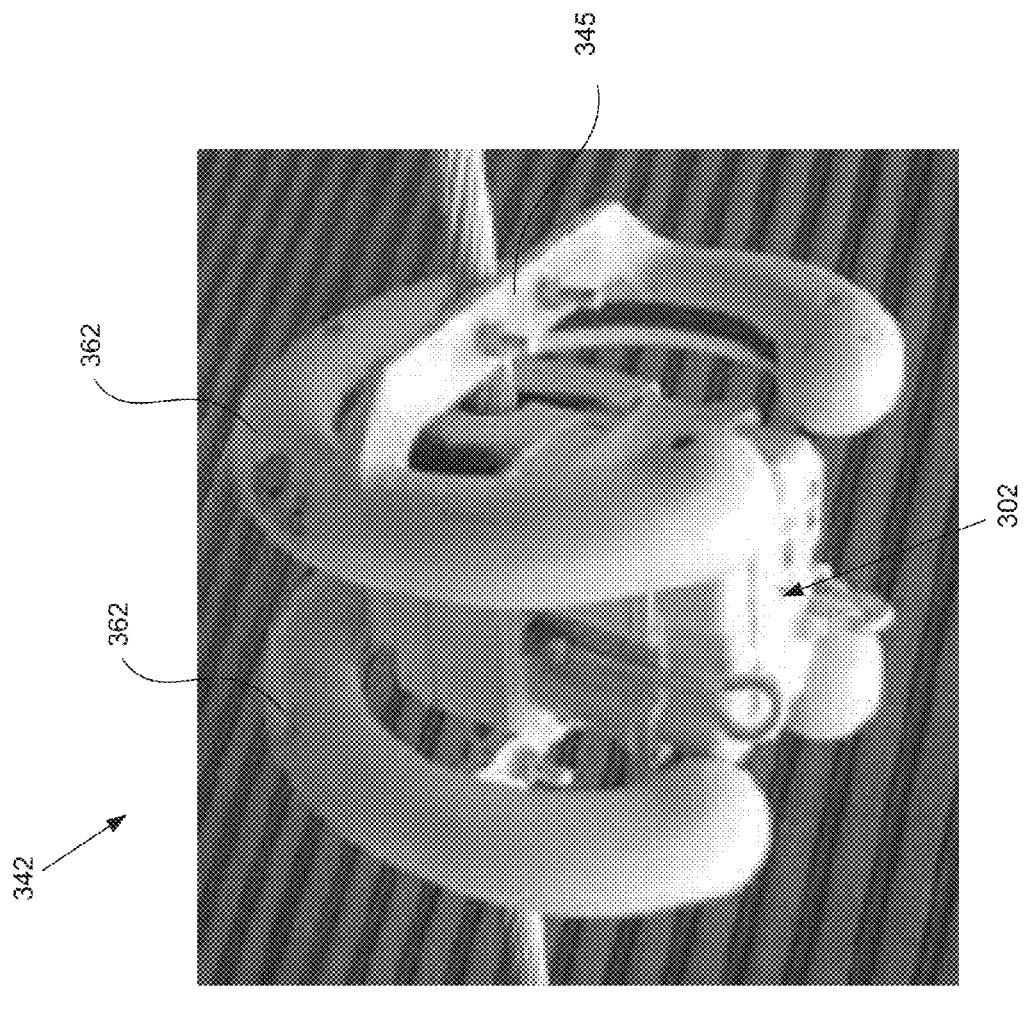
FIG. 3F shows one embodiment of an arc shield having one or more conductive rings configured to prevent damage to the conductor or line device in the event of a traveling arc.

FIG. 3F is another embodiment in which the arc shield(s) 342 comprise conductive donuts or rings 362, mounted to the power conductor with line mounts 345. In this embodiment, a pair of conductive donuts or rings is shown positioned on both sides of the line monitoring device 302, but in other embodiments a single conductive donut or ring can be placed near the line monitoring device. It should be understood that in embodiments where two or more conductive rings or donuts are installed near the line monitoring device, that each conductive donut or ring attaches to the conductor with its own line mount 345.

In the embodiments described above, the arc shield can comprise a sacrificial material such as a metal, e.g., aluminum. A sacrificial material can be any material that is designed and configured to be eroded or consumed by a lingering traveling arc. In some embodiments, it can be advantageous for the arc shield to be made out of the same material as the conductor so as to avoid a galvanic reaction between the conductor and the conductive shield. In other embodiments, the conductive shield can be other metals such as stainless steel, copper, bronze, etc.

Referring to the side view drawing of FIG. 3B, the diameter (or height/length) of the conductive shield can be approximately the height of the line monitoring device. In one specific embodiment, the conductive shield can be approximately 0.3 cm wide×23 cm in diameter. The diameter of the conductive shield is limited by the spacing between adjacent conductors in a power distribution network. Thus, the diameter of the conductive shield must be smaller than the distance between adjacent power line conductors to avoid shorting out the conductors. The conductive shield thickness sets the number of traveling arc events the shield can sustain. As the conductive shield is made thicker, it provides: a) more sacrificial material available before enough of the shield has been eroded to expose the hot line clamp and/or asset to arc damage, b) a thicker shield removes heat from the arc contact point on the perimeter quicker, minimizing the amount of material the arc vaporizes. The amount of conductive shield damage (material sacrificed) is determined by the arc fault current and the time the arc dwells in the device. Higher arc fault currents cause the arc to travel faster (higher Lorentz force), reducing dwell time. High current arc faults will also clear quicker. The conductive shield is designed to support the fault current levels and durations expected at a particular installation site as determined by the system protection scheme.

The line mounts described above can comprise hot line clamps to ensure robust electrical and mechanical connections to the power line throughout the device's lifecycle. To prevent the arc from attaching temporarily to hot line clamp, all features of the clamp can be positioned within the outside circumference of the conductive shield, conductive cage, conductive shell, or conductive rings. In some embodiments, the line mount can attach to the conductive shield, conductive cage, conductive shell, or conductive rings with a threaded screw and hex nuts to space the shield from the line mount. In one specific embodiment, the line mount can be spaced up to 2 cm from the conductive shield. The arc shield is configured to be deployed by shotgun hot-stick or lineman gloves on electrical power lines ranging from 4 kV to 35 kV. The arc shield can be advantageously retrofitted or installed alongside a power line mounted device and does not require any specialist equipment or planned outages.

When hit by a traveling electrical arc, the arc shields described herein are configured to provide a physical barrier for the line monitoring device and conductor, keeping arc gases away from the adjacently mounted line monitor. This function also keeps hot ionizing gases away from metal and plastic components that may be melted or burnt respectively.

The arc shields described herein are also configured to alter the traveling arc behavior at the power line asset location, slowing down the speed of the arc on one conductor holding the anode of the arc to the shield of the invention. The arc tends to continue at its nominal speed on the adjacent conductor, lengthening the arc. The arc will reach a critical point where it will cease to dwell on the shield, jumping across and clear of the power line asset.

The arc shields described herein provide a robust electrically conductive location upon which a traveling arc may dwell. Due to the high temperatures developed by the arc, materials coming in to contact with the arc are subject to melting or burning. On a bare conductor with a uniform surface, a 'frosting' pattern is observed after a traveling arc passes; this is considered 'normal' or 'acceptable' damage. For non-uniform surface, where a power system asset such as a power line monitor attaches to the conductor, further damage may occur around the contact point. This is typically represented by partial or full melting of one or more outside conductor strands. The arc shield component of the present disclosure offers a large mass of sacrificial material (such as aluminum) that may be consumed by the arc while it dwells. Testing has identified that an arc shield can take multiple hits from a traveling arc while providing robust protection to the adjacent line monitor device.

As for additional details pertinent to the present invention, materials and manufacturing techniques may be employed as within the level of those with skill in the relevant art. The same may hold true with respect to method-based aspects of the invention in terms of additional acts commonly or logically employed. Also, it is contemplated that any optional feature of the inventive variations described may be set forth and claimed independently, or in combination with any one or more of the features described herein. Likewise, reference to a singular item, includes the possibility that there are plural of the same items present. More specifically, as used herein and in the appended claims, the singular forms "a," "and," "said," and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. Unless defined otherwise herein, all technical and scientific terms used herein have the same meaning as commonly understood by one of ordinary skill in the art to which this invention belongs. The breadth of the present invention is not to be limited by the subject specification, but rather only by the plain meaning of the claim terms employed.

What is claimed is:

1. A system configured to protect a power distribution network and devices mounted on the power distribution network from damage caused by a traveling arc, comprising:
    a line monitoring device mounted to a conductor of the power distribution network;
    a line mount mounted on the conductor adjacent to the line monitoring device and not attached to the line monitoring device; and
    a conductive shield attached to the line mount without contacting the conductor and being substantially perpendicular to the conductor, the conductive shield comprising a sacrificial conductive material configured to be consumed by the traveling arc when the traveling arc interacts with the conductive shield.

2. The system of claim 1, wherein the conductive shield comprises a generally circular shape.

3. The system of claim 2, wherein the conductive shield comprises a cutout feature through which the conductor can pass without contacting the conductor.

4. The system of claim 3, wherein the cutout feature extends from a perimeter of the conductive shield to a central portion of the conductive shield.

5. The system of claim 1, wherein the conductive shield further comprises a plurality of holes configured to improve communications performance of the line monitoring device.

6. The system of claim 1, wherein the conductive shield has a diameter larger than a diameter or height of the line monitoring device.

7. The system of claim 1, wherein the line mount comprises a hot line clamp.

8. The system of claim 1, wherein the conductive shield is positioned on the conductor between a substation of the power distribution network and the line monitoring device.

9. The system of claim 1, wherein the line mount comprises a first line mount and the conductive shield comprises a first conductive shield, further comprising:
    a second line mount mounted on the conductor adjacent to the line monitoring device and not attached to the line monitoring device, the second line mount being mounted on an opposite side of the line monitoring device to the first line mount; and
    a second conductive shield attached to the second line mount without contacting the conductor and being substantially perpendicular to the conductor, the second conductive shield comprising a sacrificial conductive material configured to be consumed by the traveling arc when the traveling arc interacts with the second conductive shield.

10. The system of claim 1, wherein the conductive shield comprises aluminum.

11. The system of claim 1, wherein the conductive shield comprises the same material as the conductor.

12. A method of protecting a power distribution network and devices mounted on the power distribution network from damage caused by a traveling arc, comprising:
    mounting a line monitoring device on a conductor;
    mounting a line mount on the conductor adjacent to but not attached to the line monitoring device;
    attaching a conductive shield to the line mount such that the conductive shield is substantially perpendicular to the conductor without contacting the conductor; and
    allowing the conductive shield to be consumed by the traveling arc when the traveling arc interacts with the conductive shield.

13. A system configured to protect a power distribution network and devices mounted on the power distribution network from damage caused by a traveling arc, comprising:
    a line monitoring device mounted to a conductor of the power distribution network;
    a line mount mounted on the conductor adjacent to the line monitoring device and not attached to the line monitoring device; and
    a conductive cage attached to the line mount without contacting the conductor, the conductive cage at least partially surrounding the line monitoring device, the conductive cage comprising a sacrificial conductive material configured to be consumed by the traveling arc when the traveling arc interacts with the conductive cage.

14. The system of claim 13, wherein the conductive cage comprises a plurality of conductive bars.

15. The system of claim 13, wherein the conductive cage comprises aluminum.

16. A system configured to protect a power distribution network and devices mounted on the power distribution network from damage caused by a traveling arc, comprising:
    a line monitoring device mounted to a conductor of the power distribution network;
    a line mount mounted on the conductor adjacent to the line monitoring device and not attached to the line monitoring device; and
    a conductive shell attached to the line mount without contacting the conductor, the conductive shell at least partially covering the line monitoring device without contacting the line monitoring device, the conductive shell comprising a sacrificial conductive material configured to be consumed by the traveling arc when the traveling arc interacts with the conductive shell.

17. The system of claim 16, wherein the conductive shell is generally rectangular in shape.

18. The system of claim 16, wherein the conductive shield comprises at least one cutout feature through which the conductor can pass.

19. The system of claim 17, wherein the conductive shield comprises one or more plates configured to form one or more sides of the rectangular shape of the conductive shell.

* * * * *